Patented June 9, 1925.

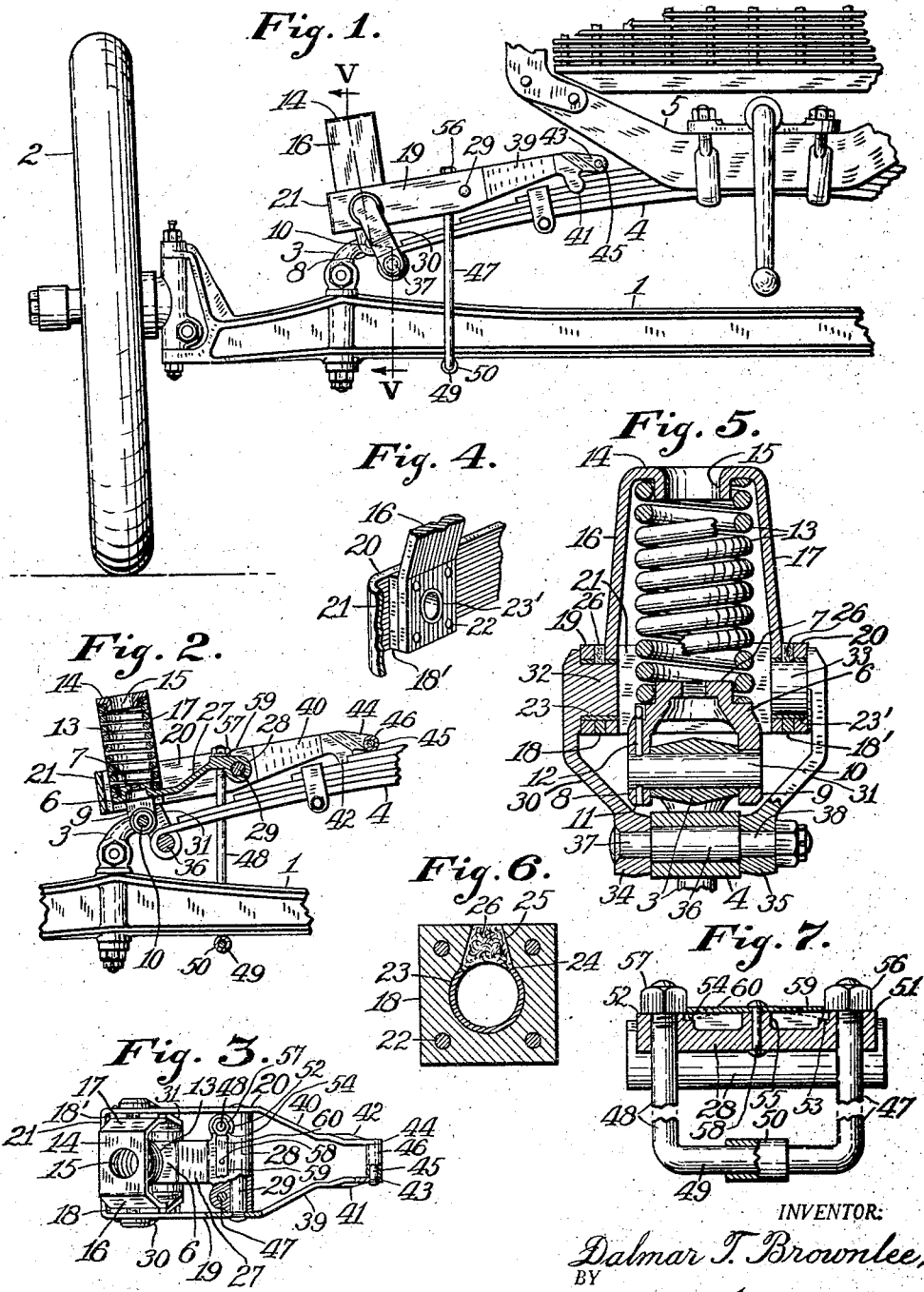
June 9, 1925.  
D. T. BROWNLEE  
1,541,474  
VEHICLE SPRING AND MOUNTING THEREFOR  
Filed Jan. 27, 1922

1,541,474

UNITED STATES PATENT OFFICE.

DALMAR T. BROWNLEE, OF INDIANAPOLIS, INDIANA.

VEHICLE SPRING AND MOUNTING THEREFOR.

Application filed January 27, 1922. Serial No. 532,210.

*To all whom it may concern:*

Be it known that I, DALMAR T. BROWN-LEE, a citizen of the United States, residing at Indianapolis, in the county of Marion and State of Indiana, have invented a new and useful Vehicle Spring and Mounting Therefor, of which the following is a specification, reference being had to the accompanying drawings and to the letters and figures of reference marked thereon.

This invention relates to an apparatus for use on vehicles, especially motor vehicles, to enable the vehicle body and occupants thereof to ride easily, the invention having reference more particularly to vehicles having half-elliptic, three-quarter elliptic, or cantilever springs. The invention relates also to a development of the apparatus described in Patent No. 1,364,701, granted to me January 4, 1921.

An object of the invention is to provide improved springs and mountings therefor which shall be of such construction as to permit manufacture at small cost and yet be strong and reliable.

Another object is to provide improved vehicle springs and mountings therefor which shall be so constructed as to effectually absorb shocks and prevent the breaking of springs on uneven or rough roads.

A further object is to provide improved springs and mountings therefor which shall be adapted for use in the construction of motor vehicles without materially changing standard construction, and which may be readily applied to existing vehicles conveniently and without material alteration of the spring mountings of the vehicle.

A still further object is to provide spring mountings for motor vehicles which shall be of such construction as to permit of extensive use of merchant bar iron or steel, or stampings, and comprising parts which shall not require expensive machining; an aim being to provide an efficient shock absorber which shall act on rough roads to prevent objectionable rebound action, and which shall be durable and economical in use.

With the above-mentioned and other objects in view, the invention consists in certain improved spring mountings for motor vehicles, the mountings being of novel and advantageous structure, including novel elements; and the invention consists also further in the parts and combinations and arrangements of parts as hereinafter particularly described and further set forth in the appended claims.

Referring to the drawings,—Figure 1 is a fragmentary front elevation of a popular type of motor vehicle and the improved spring mountings connected therewith as illustrating one arrangement of the invention and its purposes; Fig. 2 is a fragmentary front elevation of the vehicle and parts of the spring mountings in sectional elevation; Fig. 3 is a top plan of the improved spring mounting separate from the vehicle; Fig. 4 is a fragmentary perspective view of advantageously constructed parts of the spring mountings; Fig. 5 is a sectional elevation on an enlarged scale approximately on the line V—V in Fig. 1; Fig. 6 is a sectional view of one of the parts of the structure of the spring mountings; and, Fig. 7 is a fragmentary sectional elevation showing details of the rebound control device on an enlarged scale.

In the various figures of the drawings similar reference characters indicate like elements or features of construction herein referred to in detail.

The well known motor vehicle to which the invention is applied for descriptive purposes has a forward axle 1 and carrying wheels 2, only one of which is shown, the axle being provided with spring perches 3, one of which is shown as being sufficient to an understanding of the invention, the vehicle having a half-elliptic spring 4 which hitherto has been supported by links connected to the spring perches, the middle portion of the spring supporting a beam 5 of the vehicle body or frame. The beam 5 has downward extending flanges between which the spring is arranged. In the application of the invention an auxiliary spring is arranged above the spring perch and supports the end of the main spring 4 as will be further explained, and it should be understood that the invention may be similarly applied to the rear spring of the vehicle.

A practical embodiment of the invention includes a spring seat 6 which has a guide boss 7 on its top and two pivot ears 8 and 9 extending from its lower portion, the ears being suitably spaced apart to embrace the spring perch 3 to which the ears are connected by means of a pivot 10. Preferably one of the ears has a pin-hole 11 in which a securing pin 12 is inserted that extends through the pivot, removably securing the pivot in place. A coil spring 13 is seated at one end thereof on the spring seat 6. An improved hanger is provided which preferably comprises a head plate 14 having a guide flange 15 on its inner or under side that extends into the opposite end of the spring, the plate 14 being supported upon the spring and having two hanger portions 16 and 17 rigidly connected thereto and extending from opposite sides thereof approximately to or beyond the plane of the spring seat. The hanger portions are provided with improved pivot bearings preferably comprising filling plates 18 and 18' arranged on the outer sides thereof respectively and lever side bars 19 and 20 arranged on the outer sides of the filling plates respectively and connected to an end bar 21, the side bars being secured rigidly to the filling plates and the hanger portions by means of rivets 22. The pivot bearings are provided with bearing bushings 23 and 23' respectively, each bushing having an oil-way 24 in its upper portion. Each filling plate has a slot 25 in its upper portion to constitute an oil box in which suitable packing 26 is arranged. The spring seat 6 has a controlling arm 27 rigidly connected thereto, and the controlling arm has a relatively broad head 28 thereon extending across the space between the side bars 19 and 20, being connected to the bars by means of a pivot 29. The hanger includes two spring-supporting links 30 and 31 that as shown have pivot studs 32 and 33 which are rotatively arranged in the bushings of the compound pivot bearings above described, the links extending downward and inward each towards the other, the links having bosses 34 and 35 which embrace the eye at the end of the spring 4 to which they are connected by means of a pivot having a main portion 36 arranged in the eye and relatively smaller portions 37 and 38 arranged in the bosses respectively and suitably secured thereto. The lever side bars 19 and 20 have relatively angular portions 39 and 40 that extend each towards the other and have guide lips 41 and 42 thereon respectively that embrace the forward and rearward portions of the main spring 4, the angular portions being higher than the top of the spring and having ears 43 and 44 that may rest upon the spring 4 and be received between the flanges of the beam 5 when the spring is in action, the ears being connected to a rivet or axle pin 45 having a roller or thimble 46 thereon, which may be composed of hardened steel, to ride directly upon the spring 4. The side bars constructed as described constitute a compound guide arm and with the arm 27 a compound shock-absorber lever and also a controlling arm maintaining the coil spring in proper upright position or above the pivot of the spring seat.

For controlling the rebound action of the springs a loop is provided which preferably comprises rods 47 and 48 connected to a cross-bar 49 preferably having a hardened-steel thimble 50 thereon that extends under the axle of the vehicle, the rods extending upward through bosses 51 and 52 provided on the top of the head member 28, the inner sides of the bosses having recesses 53 and 54 therein respectively, the head member having a post 55 thereon midway between the bosses. The rods of the loop have nuts 56 and 57 thereon respectively that are operated upon the bosses to adjust the length of the loop. The head member 28 is provided with improved means for preventing the nuts from turning and changing the adjustment of the loop, the nut-locking means comprising a rivet 58 which secures a spring-metal plate midway between its ends to the post 55 so that spring finger locks 59 and 60 are provided which extend from the rivet to the adjacent or nearest sides of the nuts respectively and may be sprung down into the recesses respectively to permit the nuts to be turned when required.

It should be understood that the spring mounting is not limited in use to the particular arrangement shown but may be applied in other situations where the end of a leaf spring is arranged adjacent to a spring perch or equivalent device whereby to connect the spring with an axle or a frame member of a vehicle, as when the spring is secured to the axle.

In practical use, the invention as described and arranged insures steady carrying of the vehicle body without severe shocks thereto, the action of the spring 13 being supplementary to the spring 4 to ordinarily prevent the end of the spring 4 from being thrust upward violently as the vehicle wheel rises on passing over uneven roadways. When the wheel suddenly rises the axle is thrust upward from the cross-bar 49 and the shock is absorbed first by the spring 13 and then by the spring 4. When rebound occurs as the result of rapid movement of the vehicle on especially uneven ground, the middle of the main spring 4 is thrust upward, but it is checked by the loop engaging the bottom of the axle as the longer arm of the shock-absorber controlling lever is forced upward pivotally by the rising leaf spring, the shorter arm of the lever being yieldingly resisted by the coil spring.

Having thus described the invention, what is claimed as new is:

1. A vehicle spring including a spring seat having a pivot underneath it and having also a lateral controlling arm fixed thereon, a coil spring supported upon the spring seat, a hanger supported upon the coil spring and having a guide arm rigidly fixed thereto, and a loop connected substantially with the controlling arm and the guide arm.

2. A vehicle spring including a spring seat having a pivot underneath it and having also a non-elastic lateral controlling arm rigidly fixed thereon, a coil spring supported upon the seat, a hanger supported upon the coil spring and having a non-elastic guide arm rigidly fixed thereto, the guide arm having pivotal connection intermediately of its ends with the controlling arm, and a loop adjustably connected to the controlling arm.

3. A vehicle spring including a spring seat having a pivot underneath it and having also a lateral controlling arm fixed thereon, a coil spring supported upon the seat, a hanger supported upon the coil spring and having two hanger portions, two guide portions rigidly secured to the hanger bars respectively and having connection with the controlling arm, a loop connected to the controlling arm and thereby with the guide bars, and two links pivotally connected with the hanger bars respectively and also with the guide bars respectively.

4. A vehicle spring including a spring seat to be pivotally supported provided with a controlling arm rigidly fixed thereto, a coil spring supported upon the spring seat, a hanger seated upon the coil spring and provided with a shock absorber lever pivoted intermediately of its opposite ends to the end portion of the controlling arm, the lever having two side bars rigidly fixed to the hanger and also a longer arm provided on its end with a roller, a loop connected to the controlling arm adjacent to the end thereof, and two links pivotally connected to the hanger.

5. A vehicle spring including a spring seat to be pivotally supported provided with a controlling arm rigidly fixed thereto, a coil spring supported upon the spring seat, a hanger seated upon the coil spring, two links having each a pivot stud rigidly fixed thereto, the studs being connected with opposite sides of the hanger, a pivot bolt connected to the links to support a leaf spring, and a lever pivotally connected between its opposite ends to the end of the controlling arm, the lever having an arm rigidly fixed to the hanger, and a longer arm adapted at its end to have bearing upon the leaf spring.

6. A vehicle spring and mountings therefor comprising a spring seat having a pivot to support the seat and having also a controlling arm fixed thereon, a coil spring seated on the spring seat, a hanger comprising a plate and two hanger portions provided each with a guide arm having connection with the controlling arm, the plate of the hanger being seated on the coil spring, links connected to the hanger portions respectively, and a leaf spring connected to the links and supporting the guide arms.

7. A vehicle spring and mountings therefor comprising a spring seat having a pivot to support the seat and having also a lateral arm to control pivotal movement of the seat, a coil spring seated on the spring seat, a hanger comprising a head plate and two hanger portions having each a guide arm fixed thereon, the guide arms being connected together to constitute a lever, the head plate being seated on the coil spring, means pivotally connecting the lateral arm to the guide arms, links pivotally connected to the hanger portions respectively, a leaf spring connected to the links and supporting the guide arms, and a loop having two rods connected to the lateral arm of the spring seat.

8. In a vehicle spring, the combination with a coil spring, and a spring seat on one end of the coil spring, of a hanger member seated on the opposite end of the coil spring and having two guide arms fixed thereto, each arm having a relatively angular portion extending over towards the other angular portion and provided with a guide lip, each of said angular portions having an ear thereon beyond the lip, the ears being set over each towards the other and connected each with the other, and links pivotally connected to the hanger member.

9. In a vehicle spring, the combination with a spring seat having a pivot, and a coil spring on the spring seat, of a hanger comprising a head plate and two hanger portions extending from the opposite sides respectively of the plate, the head plate being seated on the coil spring and having a guide flange extending into the spring coil, each hanger portion having a compound pivot bearing comprising a filling plate and a side bar secured to the hanger portion and a bearing bushing secured therein, the filling plate having an oil-receptacle and the bushing having an oilway therein, and links having pivots arranged in said bushings respectively.

10. In a vehicle spring, the combination with a coil spring, of a hanger member seated on one end of the coil spring and having two guide arms fixed thereto, a spring seat on the opposite end of the coil spring and having two pivot ears and also a controlling arm fixed thereto, the controlling arm having a relatively broad head member thereon that is pivoted to the two guide arms, the head member having two bosses thereon provided each with a recess, a loop having two rods extending through the bosses, nuts on the rods and seated on the bosses respectively, and two spring-fingers secured to the head member and extending to the nearer sides of said nuts to lock them in place, the ends of the spring-fingers being movable into the recesses respectively to release the nuts.

11. The combination with a vehicle axle, a leaf spring, and a coil spring, of a spring seat pivotally mounted substantially upon the axle and provided with a controlling arm to limit the pivotal movement thereof, the coil spring being supported upon the spring seat, a hanger supported upon the coil spring and having connection with the leaf spring, a lever having two side bars pivotally connected with the controlling arm and rigidly secured to opposite portions of the hanger, the lever having also an arm portion integral with the side bars that is relatively narrow at its end and has bearing contact upon the top of the leaf spring, and a loop loosely embracing the axle and connected to the controlling arm to afford a fulcrum for the lever.

12. A vehicle spring including an axle and a pivoted support, a coil spring seated on the support, a hanger seated on the coil spring, a leaf spring connected at its end with the hanger, a compound controlling arm having a shorter member rigidly connected to the pivoted support, and hinged to a longer member extending from the hanger and having bearing on the leaf spring, and means between the axle and the hinged portion of the compound arm to limit the play of the spring seat on its pivot.

In testimony whereof, I affix my signature in presence of two witnesses.

DALMAR T. BROWNLEE.

Witnesses:
  E. T. SILVIUS,
  ROBERT LIEBRICH.